United States Patent
Lewis et al.

[11] Patent Number: 6,149,343
[45] Date of Patent: Nov. 21, 2000

[54] METHOD AND APPARATUS FOR CONTROLLING ZEBRA MUSSELS AND OTHER BIVALVES USING ULTRAVIOLET RADIATION

[75] Inventors: Donald Philips Lewis, Dundas; G. Elliot Whitby, Toronto, both of Canada

[73] Assignee: Trojan Technologies, Inc., Canada

[21] Appl. No.: 08/654,659

[22] Filed: May 30, 1996

[51] Int. Cl.[7] .................................................. C02F 1/32
[52] U.S. Cl. ........................ 405/127; 119/720; 210/748
[58] Field of Search .................................. 405/127, 211; 119/234, 720, 219; 210/748; 43/124

[56] References Cited

U.S. PATENT DOCUMENTS

| | | | |
|---|---|---|---|
| 5,308,505 | 5/1994 | Titus et al. | 210/748 X |
| 5,320,749 | 6/1994 | Mullen | 210/748 X |
| 5,322,569 | 6/1994 | Titus et al. | 210/748 X |
| 5,655,483 | 8/1997 | Lewis et al. | 405/127 X |

*Primary Examiner*—Tamara Graysay
*Assistant Examiner*—Frederick L. Lagman
*Attorney, Agent, or Firm*—Fitzpatrick, Cella, Harper & Scinto

[57] ABSTRACT

A method and apparatus for controlling zebra mussels and other bivalves using UV light from a medium pressure UV lamp which is located in a chamber having therein water in which the bivalves are located. The medium pressure UV lamp provides an intensity of UV light measured at a wavelength of 254 nm of at least approximately 6830 $\mu W/cm^2$ in the water. The medium pressure UV lamp provides a dose of UV light measured at a wavelength of 254 nm of at least approximately 0.1 $W.sec/cm^2$ in the water.

16 Claims, 3 Drawing Sheets

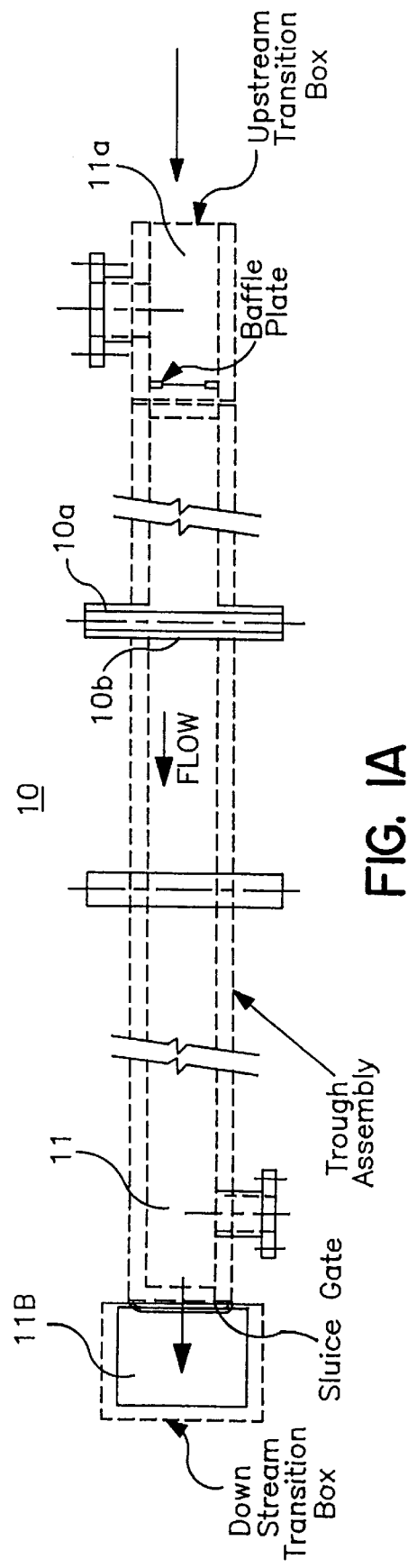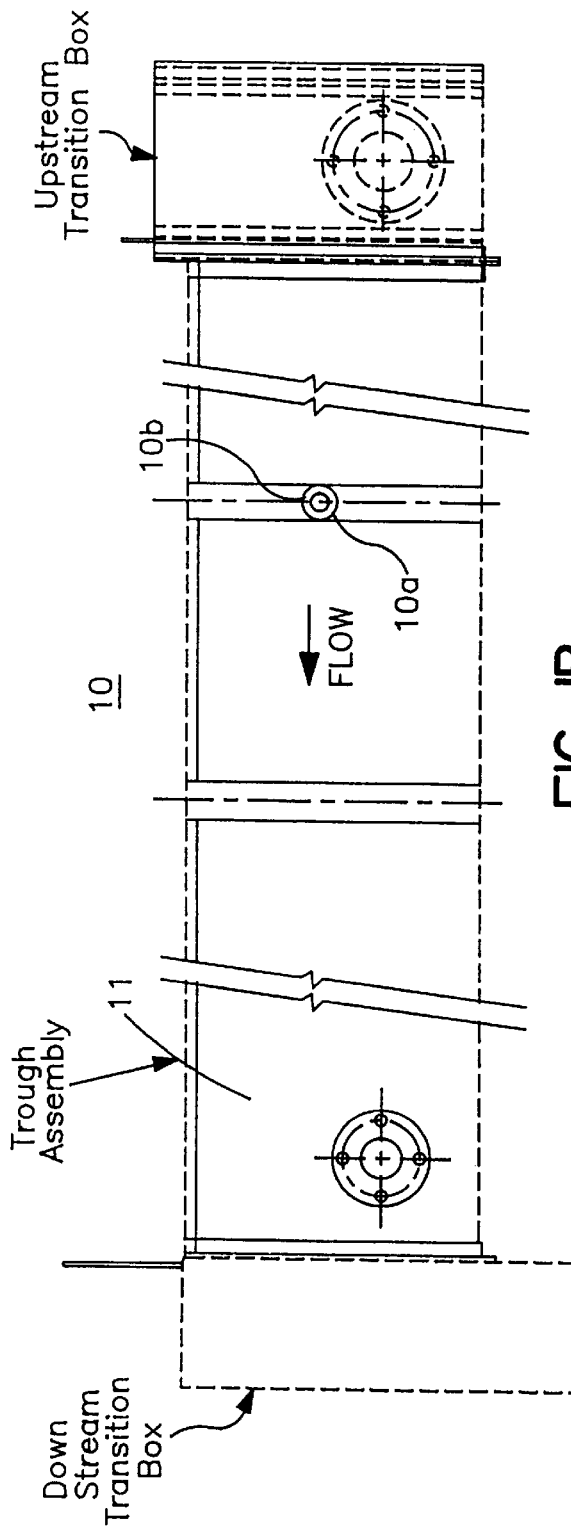

६,१४९,३४३

METHOD AND APPARATUS FOR CONTROLLING ZEBRA MUSSELS AND OTHER BIVALVES USING ULTRAVIOLET RADIATION

FIELD OF THE INVENTION

This invention relates to the control of zebra mussels and other bivalves and more particularly to a method and apparatus for using ultraviolet (UV) light to control such bivalves.

DESCRIPTION OF THE PRIOR ART

Electrical power generating and industrial plants in the United States and Canada that border the Great Lakes use water from those lakes in performing their processes. The presence of the zebra mussel in the Great Lakes has affected the ability of such plants to obtain water from those lakes. Zebra mussels have also been found in the Ohio and Mississippi rivers and in the estuary of the St. Lawrence river. Another species of mussels, known as the quagga, has recently been identified in the Great Lakes.

Zebra mussel veligers reach a stage in their maturation wherein they settle and attach themselves to the surfaces of water intake and distribution piping systems of electrical power generating and industrial plants thereby reducing the diameters of those pipes. In addition to veliger settlement, a new phenomenon which appears to be a year round activity, has recently been described. In this phenomenon, juvenile zebra mussels, known as translocators, detach themselves from their original substrate and reenter the water column. The translocators may be a further threat to service water systems if the juvenile zebra mussels are small enough to pass through screens and coarse filters and into the systems where they may settle again and grow.

The primary concern of water users is to prevent the colonization of water systems surfaces by the zebra mussel. Chemical oxidants, particularly chlorine, have been widely used in both the United States and Canada to combat such colonization. While these treatments appear to be very effective they do have some drawbacks.

Chlorination may result in the formation of byproducts that may be damaging to the aquatic environment and human health. In addition, the potential for over chlorination or spills poses a risk to aquatic life in the vicinity of the outfalls. Further there is the added cost to the water user of dechlorination and concern with meeting the effluent requirements of government agencies such as the Ontario Ministry of the Environment and Energy. Therefore, there are many water users who do not have the ability or the inclination to use chlorine or other chemicals to control zebra mussels.

One alternative to the use of chlorine is to use another oxidant or some other potentially toxic material. This alternative does not appear to be viable as it may give rise to new production, handling and long term environmental concerns which may be potentially more damaging than those already understood with chlorine.

Another alternative is to redesign water intake and distribution piping systems so as to minimize the ability of the zebra mussels to attach themselves to the surfaces of these systems. While this may be a long term solution to the problem, it is not economically feasible, in the short term, to replace present systems with redesigned systems. Therefore, it is desirable to have a new mechanism for controlling zebra mussels that is either non-chemical or reduces the amount of chemicals that are used and can immediately be put into effect without substantial economic impact.

One proposed non-chemical solution is the use of UV light. UV light is used throughout the world to disinfect air, water and surfaces and has recently become popular to treat large volumes of municipal wastewater. Ontario Hydro has shown that a flow through UV system using a single low pressure mercury lamp would prevent the downstream settlement of zebra mussels. However, Ontario Hydro did not investigate the dose of UV light needed to prevent settlement and the mechanism by which the UV light prevented the settlement of the mussels.

As is well known, a low pressure mercury lamp produces all of its UV light at a wavelength of 254 nm. This wavelength is readily absorbed by organic compounds that are in water. We have shown that UV light at a wavelength of 254 nm is effective in controlling zebra mussels and is a viable economic alternative to chemical oxidants. The results of our experiments in controlling zebra mussels for low flow rates with UV light from a low pressure lamp are described in our U.S. Pat. application Ser. No. 08/411,131 which was filed in the Patent and Trademark Office on Mar. 27, 1995 and is assigned to the same assignees as is the present invention.

As is well known, UV light may also be produced from a medium pressure mercury lamp. While such a lamp produces UV light at 254 nm, it is well known that such a lamp produces the largest portion of its UV light at a wavelength of 365 nm. Therefore, the other wavelengths of UV light from a medium pressure UV lamp may also be useful in controlling zebra mussels. Thus, it is desirable to determine if light from a medium pressure UV lamp can control zebra mussels and the dose of UV light that provides such control.

SUMMARY OF THE INVENTION

A method for controlling bivalves wherein a medium pressure UV lamp assembly provides an intensity of UV light measured at a wavelength of 254 nm which is at least approximately 6830 $\mu W/cm^2$ in the water wherein the bivalves are located.

A method for controlling bivalves wherein a medium pressure UV lamp assembly provides a dose of UV light measured at a wavelength of 254 nm which is at least approximately 0.1 $W.sec/cm^2$ in the water wherein the bivalves are located.

An apparatus having a chamber for treating a quantity of water in the chamber. A medium pressure UV lamp assembly is located in the chamber. The lamp assembly provides an intensity of UV light measured at a wavelength of 254 nm which is at least approximately 6830 $\mu W/cm^2$ in the water. The lamp assembly provides a dose of UV light measured at a wavelength of 254 nm which is at least approximately 0.1 $W.sec/cm^2$ in the water.

DESCRIPTION OF THE DRAWING

FIGS. 1a and 1b show the top and front views of an open channel single medium pressure UV lamp system for performing a test on the effect of UV light in controlling zebra mussels.

DESCRIPTION OF THE PREFERRED EMBODIMENT(S)

Figure 2:
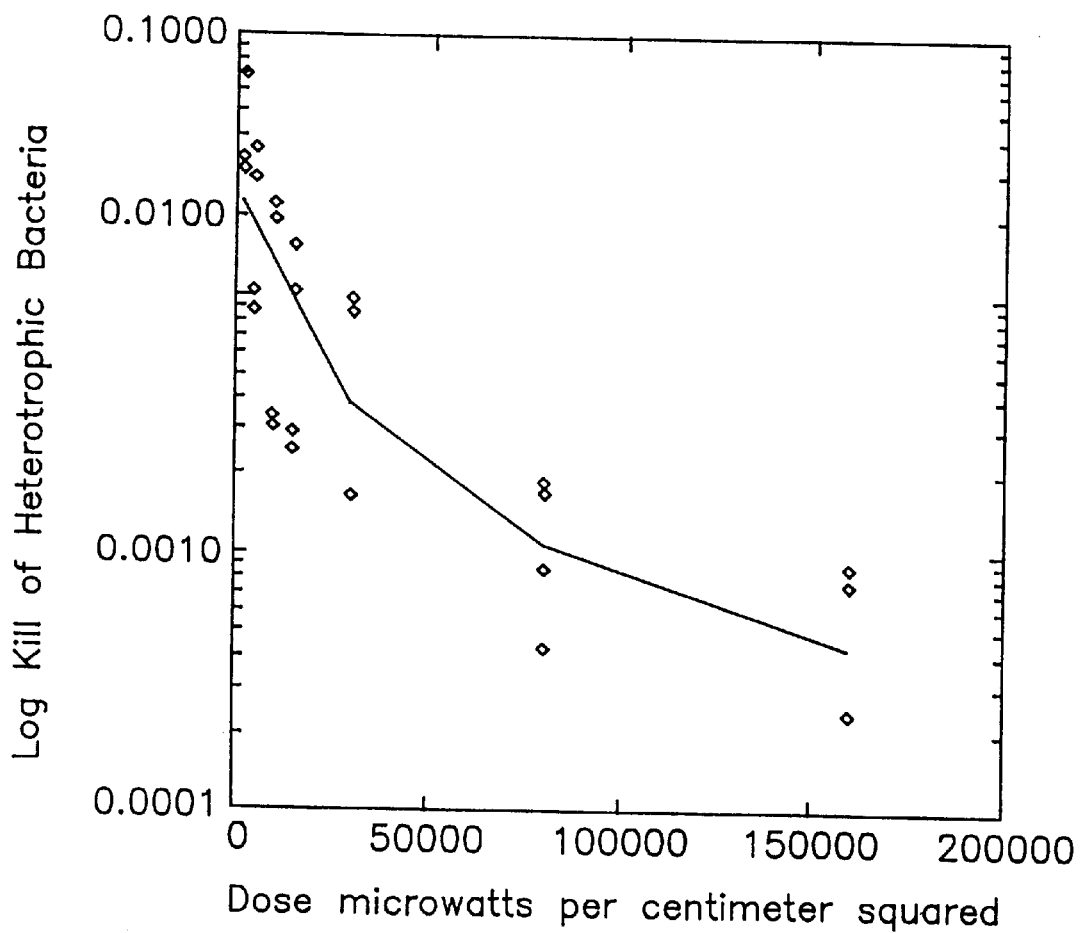
FIG. 2 shows the curve of the logarithmic kill of the heterotrophic bacteria versus dose for the medium pressure lamp used in the open channel system. This curve was used to determine the minimum dose of light from the medium pressure lamp sufficient to control the veligers.

Referring now to FIGS. 1a and 1b, there is shown an open channel system 10 that was used to perform a flow through test to determine if UV light from a medium pressure lamp would economically control the settlement of zebra mussels. The open channel system 10 includes a chamber 11 having a water inlet 11a and a water outlet 11b. The lamp chamber 11 measured approximately 4.5×90×18 inches (11.43× 228.6×45.72 cm), was made from stainless steel and had mounted therein a single medium pressure UV lamp 10a enclosed in a quartz sleeve 10b.

The lamp is positioned horizontally in the chamber perpendicular to the flow of water along the length of the chamber so that the lamp could be raised and lowered to vary the water flow around the lamp. The depth of the water in the chamber was 12 inches (30.48 cm). The surface of the lamp's protective quartz sleeve was cleaned weekly from Aug. 2, 1995 to Oct. 16, 1995. The sleeve remained completely clean during this period.

System 10 was installed at Ontario Hydro's Nanticoke power generating station which is located on the north shore of Lake Erie in the Province of Ontario Canada. That generating station uses water from Lake Erie in its combustion processes. Water for system 10 was obtained by placing a submersible pump in the intake to the station. The water was pumped into the lamp chamber.

System 10 also included two settling chambers, not shown. A portion of the untreated or upstream water entering system 10 was passed through one of the chambers. A portion of the UV treated or downstream water was passed through the other settling chamber. The water in the settling chambers were used to determine both the instantaneous and long term mortalities for the zebra mussel veligers. A filtered water sample of at least 20 liters was taken at the effluent of each of the two settling chambers about two to three times per week during the zebra mussel study period. The study period started in early August and ended in mid October. The sample was analyzed for the presence, age, density and mortality of free swimming veligers and post veligers.

Each of the chambers included six (6) vertically mounted polyvinyl chloride (PVC) settling plates. The PVC plates in each of the settling chambers were scraped and analyzed at the end of the study period for settled mussels.

The lamp 10a used about 1200 watts of power to produce 1000 watts of total light. As is well known, the typical medium pressure UV lamp produces only about 10 to 12 percent of its UV light in the germicidal range. The medium pressure lamp produces about 88% of its light at longer wavelengths with the largest portion of that light produced at 365 nm.

The mean water flow rate to system 10 was 40 US gallons per minute. The maximum flow rate was 86 USGPM and the minimum was 16.7 USGPM.

After termination of the operation of system 10, scrapings were taken from the walls of the settling chamber 14 and analyzed for the presence of settled zebra mussels.

During the operating period of system 10 the average UV transmission at the 254 nm wavelength was an average of 93.4%, with a minimum transmission of 89% and a maximum transmission of 95%. As is well known to those skilled in the art, the average UV transmission is a measure, in percent, of how well the water in which a UV lamp is immersed transmits the UV light with 100% indicating that the water transmits all of the UV light emitted from the lamp.

Referring now to Table 1 below, there is shown the instantaneous mortality rates for system 10 during the zebra mussel study period.

TABLE 1

| Date - Mo/Day/Yr | Control- No UV Light | UV Light Mortality Rate |
|---|---|---|
| 22/08/95 | 9.8 | 63.7 |
| 29/08/95 | 17.0 | 42.6 |
| 05/09/95 | 19.1 | 86.8 |
| 06/09/95 | 6.0 | 78.5 |
| 07/09/95 | 20.6 | 96.0 |
| 08/09/95 | 20.4 | 100.0 |
| 19/09/95 | 11.8 | 100.0 |
| 26/09/95 | 31.3 | 100.0 |
| 03/10/95 | 72.3 | 100.0 |
| 17/10/95 | 50.0 | 100.0 |

The dates in Table 1 are those days when a sample of water was taken from the downstream settling chamber and the upstream settling chamber which acted as a control as the water in that chamber was not exposed to UV light from the medium pressure lamp, in order to determine the instantaneous mortality rate. As shown in Table 1, the instantaneous mortality rate was not 100% during the first two weeks of the sampling period. We believe this is due to algae and other debris catching on the baffle plate, lamp and level gate making the water level too high over the lamps. This reduced mortality during the first two weeks was not reflected in the veliger settlement as can be seen in Table 2, below.

Table 2 shows that the post veliger densities at the outlet, sides and inlet of the upstream and downstream settling chambers. As can be seen there was a dramatic reduction in the density of the attached veligers on the settling chamber surfaces after treatment with light from the medium pressure UV lamp.

TABLE 2

| Settling Chamber | Density By Sample Location | | |
|---|---|---|---|
| | Outlet | Sides | Inlet |
| Upstream | 3608 | 18589 | 7784 |
| Downstream | 20 | 227 | 20 |

Table 3 shows the mean density of settled mussels on the plates of the upstream and downstream settling chambers. The UV light from the medium pressure lamp eliminated the settling of the zebra mussels.

TABLE 3

| Settling Chamber | Density |
|---|---|
| Upstream | 4707 |
| Downstream | 0 |

One of the results obtained from system 10 during the zebra mussel study period was the intensity of UV light and the dose of UV light that the zebra mussels were exposed to in passing through the chamber 11. It is well known that dose and intensity are related as follows:

$$Dose = Intensity \times Time.$$

wherein Time is the time of exposure of the zebra mussels to the UV light in seconds, Intensity is measured in $W/cm^2$ and Dose is measured in $W.sec/cm^2$.

It is difficult to measure the killing power of a medium pressure UV lamp with an intensity probe because of the multiple wavelengths. Therefore, the intensity was measured in terms of light at a wavelength of 254 nm. The total output of the medium pressure lamp was measured using the method of Qualls and Johnson described in Applied and Environmental Microbiology, Volume 45, No. 3, pages 872–877.

The UV probe used in this method is calibrated at a wavelength of 254 nm and only sees light at this wavelength. The particular probe used was an International Light model IL1700 radiometer with a SUD 240 detector and wide angle diffuser.

Using this method the total output of the lamp at 254 nm was 46.3 watts. This value was used to calculate the lowest and highest intensity the zebra mussels were subjected to. The lowest intensity is at the surface of the water, which is 15.24 cm away from the center of the lamp, and the highest intensity is at the surface of the lamp.

The intensities, I, were calculated using the following equation (which is from the EPA Disinfection Design Manual):

$$I = [P/Area] \times e^{-(R)}$$

where P is the power, that is total output, of the medium pressure lamp in terms of light at 254 nm, Area is the area of the cylinder of water surrounding the medium pressure lamp (the lamp is presumed to be a point source of light), is the absorbance coefficient and R is the radius of the cylinder in centimeters. While the total output of the lamp is 46.3 watts the lamp is surrounded by a quartz sleeve which reduces the output of the lamp by ten percent (10%). Therefore, P=41.67 watts. The lamp is centered in 12 inches (30.48 cm) of water and the length of the chamber is 11.43 cm. Therefore, R=15.24 cm and the Area is:

$$2\pi \times (15.24) \times (11.43) = 1094.49 \text{ cm}^2.$$

Using the above and an absorbance coefficient of 0.1459, the lowest intensity, $I_L$ was calculated as follows:

$$I_L = [41.67/1094.49] \times e^{-(0.1459 \times 15.24)}$$

$$I_L = 6.83 \times 10^{-3} \text{ W/cm}^2$$

Using the above and an absorbance coefficient of zero the highest intensity, $I_H$, was calculated to be 0.352 W/cm².

It is very difficult to mathematically calculate the UV dose within a flowing reactor. In order to determine the dose, the heterotrophic bacteria in the lake water supply to the generating station were subjected to UV irradiation to provide a curve of kill, measured on a logarithmic scale, versus the UV dose. The heterotrophic bacteria were counted at both the influent and the effluent of system 10 using method 9215 from Standard Methods for the Examination of Water and Wastewater (1992). This count is an indicator of the UV dose from the medium pressure lamp to which the veligers were subjected.

Figure 3:
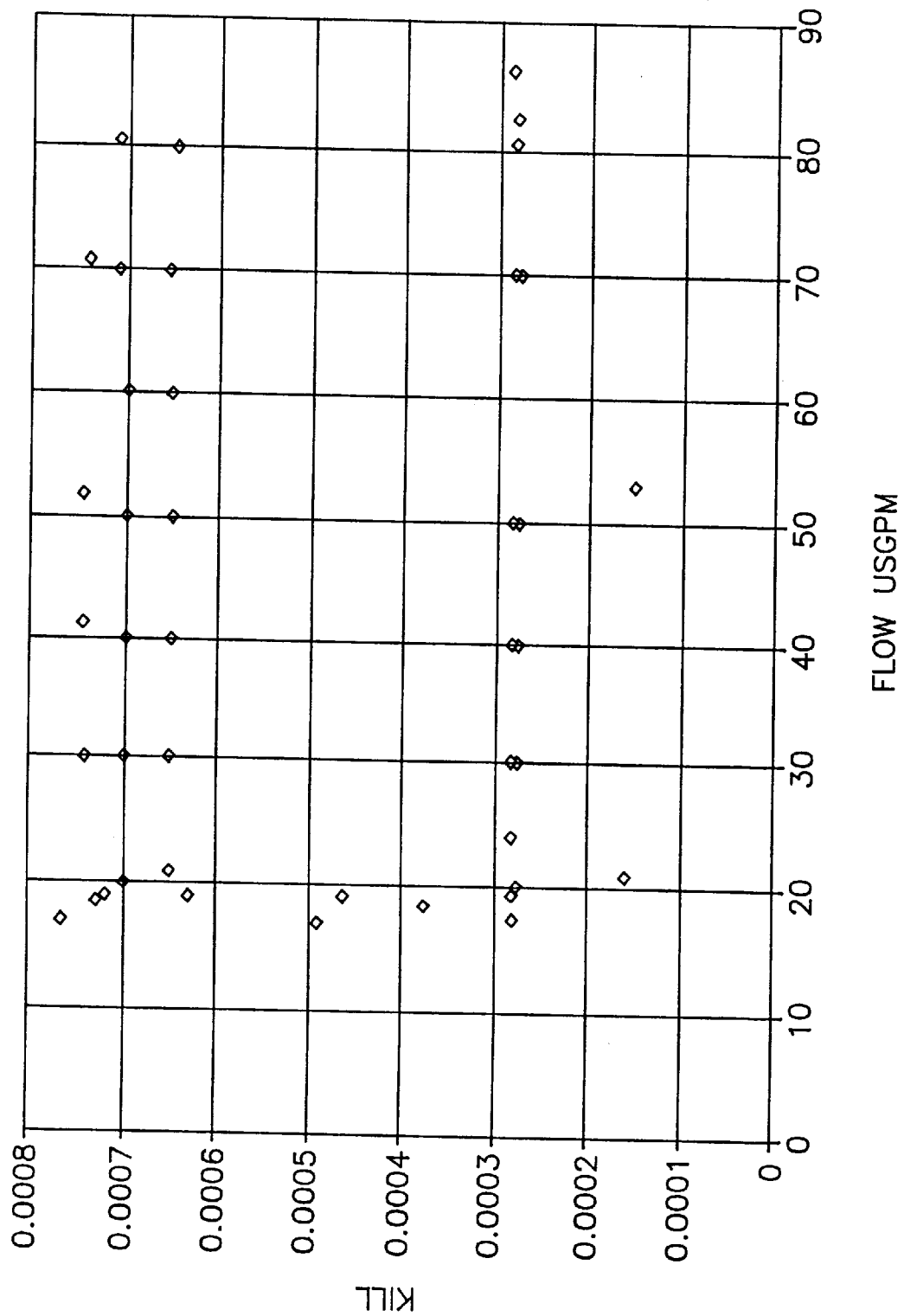
FIG. 3 shows a distribution of the logarithmic kill of the heterotrophic bacteria after they passed through the open channel medium pressure UV system.

Referring now to FIG. 2, there is shown a dose response curve of kill, measured on a logarithmic scale, versus dose. The logarithmic kill is the logarithm of the difference between the counts at the influent and effluent of the system divided by the count at the influent. The dose response curve was prepared for the heterotrophic bacteria count by the above referenced method of Qualls and Johnson. The curve in combination with the veliger kill data sampled from system 10 allows the determination of the minimum dose of UV light from the medium pressure lamp that is sufficient to control the veligers. The sampling data as shown in FIG. 3 shows that the minimum logarithmic kill is 0.0008. Therefore, using the dose response curve it is determined that a minimum dose of about 0.1 W.sec/cm² of UV light from a medium pressure lamp is sufficient to control the veligers.

It should be appreciated that the present invention may also be used to control other bivalves such as for example, Corbicula fluminea, quagga and Limnoperna fortunei.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method for controlling bivalves in water, comprising the steps of:
   providing from a medium pressure UV lamp assembly an intensity of UV light measured at a wavelength of 254 nm which is at least approximately 6830 µw/cm² in said water wherein said bivalves are located;
   providing from said UV lamp assembly other UV light of a wavelength different than 254 nm.

2. The method of claim 1 wherein said medium pressure UV lamp assembly is a single medium pressure UV lamp.

3. The method of claim 1 wherein said intensity of UV light is at least 6830 µW/cm².

4. A method for controlling bivalves in water comprising:
   providing from a medium pressure UV lamp assembly a dose of UV light measured at a wavelength of 254 nm which is at least approximately 0.1 W.sec/cm² in said water wherein said bivalves are located; and
   providing from said UV lamp assembly other UV light of a wavelength different than 254 nm.

5. The method of claim 4 wherein said medium pressure UV lamp assembly is a single medium pressure UV lamp.

6. The method of claim 4 wherein said dose of UV light is at least 0.1 W.sec/cm².

7. An apparatus for treating water, comprising:
   (a) a chamber having a quantity of said water therein; and
   (b) a medium pressure UV lamp assembly located in said chamber, said lamp assembly providing an intensity of UV light measured at a wavelength of 254 nm which is at least approximately 6830 µw/cm² in said water, said lamp assembly also providing other UV light of a wavelength of approximately 365 nm.

8. The apparatus of claim 7 wherein said medium pressure UV lamp assembly is a single medium pressure UV lamp.

9. The apparatus of claim 7 wherein said intensity of UV light is at least 6830 µW/cm².

10. The apparatus of claim 7 wherein said lamp assembly is positioned horizontally in said chamber perpendicular to the flow of said water along the length of said chamber.

11. The apparatus of claim 7 wherein said chamber has an inlet for receiving additional quantities of said water and an outlet for allowing said water exposed to said UV light intensity to leave said chamber.

12. An apparatus for treating water, comprising:

(a) a chamber having a quantity of said water therein; and (b) a medium pressure UV lamp assembly located in said chamber, said lamp assembly providing a dose of UV light measured at a wavelength of 254 nm which is at least approximately 0.1 W.sec/cm$^2$ in said water, said lamp assembly also providing other UV light of a wavelength of approximately 365 nm.

13. The apparatus of claim 12 wherein said medium pressure UV lamp assembly is a single medium pressure UV lamp.

14. The apparatus of claim 12 wherein said dose of UV light is at least 0.1 W.sec/cm$^2$.

15. The apparatus of claim 12 wherein said lamp assembly is positioned horizontally in said chamber perpendicular to the flow of said water along the length of said chamber.

16. The apparatus of claim 12 wherein said chamber has an inlet for receiving additional quantities of said water and an outlet for allowing said water exposed to said UV light intensity to leave said chamber.

* * * * *